(12) United States Patent
Loewen et al.

(10) Patent No.: US 6,798,744 B1
(45) Date of Patent: Sep. 28, 2004

(54) METHOD AND APPARATUS FOR INTERCONNECTION OF FLOW-CONTROLLED COMMUNICATION

(75) Inventors: Jonathan David Loewen, Belcarra (CA); John Richard Bradshaw, Burnaby (CA); Jeffery John Brown, Maple Ridge (CA)

(73) Assignee: PMC-Sierra, Inc., Burnaby (CA)

( * ) Notice: Subject to any disclaimer, the term of this patent is extended or adjusted under 35 U.S.C. 154(b) by 0 days.

(21) Appl. No.: 09/574,305

(22) Filed: May 19, 2000

Related U.S. Application Data (63) Continuation-in-part of application No. 09/569,763, filed on May 12, 2000.
(60) Provisional application No. 60/134,959, filed on May 19, 1999, provisional application No. 60/136,680, filed on May 28, 1999, and provisional application No. 60/134,119, filed on May 14, 1999.

(51) Int. Cl.[7] ............... H04L 12/26; H04L 12/56
(52) U.S. Cl. ................... 370/235; 370/395.4
(58) Field of Search .............. 370/395.21, 395.4, 370/395.41, 442–462, 230, 231, 235, 236

(56) References Cited

U.S. PATENT DOCUMENTS

| | | | |
|---|---|---|---|
| 5,155,825 A | | 10/1992 | Moughanni et al. |
| 5,260,978 A | | 11/1993 | Fleischer et al. |
| 5,319,633 A | | 6/1994 | Geyer et al. |
| 5,473,693 A | | 12/1995 | Sprunk |
| 5,541,924 A | * | 7/1996 | Tran et al. .............. 370/347 |
| 5,579,312 A | * | 11/1996 | Regache ................ 370/397 |
| 5,633,858 A | | 5/1997 | Chang et al. |
| 5,642,152 A | | 6/1997 | Douceur et al. |
| 5,671,745 A | | 9/1997 | Park et al. |
| 5,715,165 A | | 2/1998 | Luh et al. |
| 5,729,541 A | * | 3/1998 | Hamalainen et al. ....... 370/337 |
| 5,781,535 A | | 6/1998 | Russ et al. |
| 6,104,727 A | * | 8/2000 | Moura et al. ............... 370/468 |
| 6,160,806 A | * | 12/2000 | Cantwell et al. ............ 370/360 |
| 6,240,083 B1 | * | 5/2001 | Wright et al. ............... 370/348 |
| 6,351,469 B1 | * | 2/2002 | Otani et al. ................. 370/459 |
| 6,493,335 B1 | * | 12/2002 | Darcie et al. ............... 370/344 |
| 6,563,829 B1 | * | 5/2003 | Lyles et al. ............ 370/395.21 |

OTHER PUBLICATIONS

US 5,699,349, 12/1997, Russ et al. (withdrawn)
Tian, Yuxing. *A Survey on Connection Admission Control in ATM Networks*. DePaul University, Chicago, IL. 9 pages.

* cited by examiner

*Primary Examiner*—Alpus H. Hsu
*Assistant Examiner*—Toan D. Nguyen
(74) *Attorney, Agent, or Firm*—Stephen J. LeBlanc; Quine Intellectual Property Law Group, P.C.

(57) ABSTRACT

A method or system or apparatus provides improved digital communication. In one aspect, flow control in performed by receiving status preprended to data units in a combined data channel, where the status data indicated the available status of a number of far end receiving channels. Thus data may be sent only to available receiving channels. In a further aspect, a frequency reference may also be transmitted by including data in data units in a combined channel. In a further aspect, an active channel can be selected among two redundant channels by use of an active bit in said data units. The invention has particular applications to ATM-type communication systems and may also be used in other communication systems.

24 Claims, 6 Drawing Sheets

FIG. 1

FIG. 2 HIGH-SPEED SERIAL LINK DATA STRUCTURE

| Byte | Bits | Mnemonic | Description |
|---|---|---|---|
| 0 | 7:0 | CA[15:8] | The CA[15:0] bits carry logical channel flow control information in the upstream direction. To support 32 logical channels, the status for each logical channel is sent every other cell; the CASEL indicates which half is represented. If CASEL is logic 0, CA[15:0] corresponds to those logical channels with UTOPIA addresses 0 through 15. If CASEL is logic 1, CA[15:0] corresponds to those logical channels with UTOPIA addresses 16 through 31.<br>In the downstream direction, CA[0] is the only relevant bit and it flow controls the aggregate. A logic 0 indicates the far end can accept no more cells, and the S/UNI-DUPLEX will immediately start sending idle cells. If this bit is a logic 1, the S/UNI-DUPLEX is free to send all queued traffic. To allow inter-operability with a device that may be flow controlled on a logical channel basic, CA[15:1] are set to the same state as CA[0].<br>In the event of an erroneous header (as detected by an incorrect HCS), the CA bits will be assumed to be all zero. This ensures cells are not transmitted for which there is no buffer space. |
| 1 | 7:0 | CA[7:0] | |
| 2 | 7 | CASEL | The state of the CA select bit determines which half of the modems the CA[15:0] bits correspond to. CASEL toggles with each cell transmitted. |
| 2 | 6 | UPCA | The UPCA bit carries flow control information for the microprocessor control channel. If this bit is one, control channel cells may be transferred.<br>In the event of an errored header, the UPCA bit will be assumed to be zero. This ensures cells are not transmitted for which there is no buffer space. |
| 2 | 5:0 | PHYID | The PHY identifier determines to which PHY a cell is destined in the downstream direction and from which PHY it came in the upstream direction. It also indicates whether the cell is a stuff or control channel cell. The field is encoded as follows:<br>"111111" – Stuff cell provided for cell rate decoupling. The payload carries no useful data and the cell shall be discarded.<br>"111110" – Control channel cell. On the transmit serial link, PHYID shall equal this value for all cells inserted via the Microprocessor Cell Buffer and for all cells received from the Any-PHY interface whose inband address matches that programmed by the Control Channel Base Address register. All cells received on the serial link with this encoding will be routed to the local microprocessor if the ROUTECC register bit is a logic 1. Otherwise, the cells are routed to the SCI-PHY/Any-PHY interface. "100000" to "111101" – Reserved;<br>"000000" to "011111" – Logical channel index for PHY device. |
| 3 | 7 | BOC | The Bit Oriented Code (BOC) bit position carries a repeating 16-bit pattern that encodes one of 63 possible code words used for remote control and status reporting. Three codes are predefined to represent a remote defect, a loopback activate request and a loopback deactivate request. The remaining codes are either reserved or user defined. The receiver ensures the pattern is the same for 8 of 10 (default) or 4 of 5 repetitions before validating a new code word. Refer to the Bit Oriented Codes section for more details. |
| 3 | 6 | ACTIVE | The link active bit indicates which of the redundant links is currently chosen. The S/UNI-DUPLEX will switch to the link which contains a one in this location for at least 3 consecutive cells. The line card microprocessor can override this selection. The transmitted ACTIVE bit is set by the per-link ACTIVE register bits. To confirm which link is active, the received ACTIVE bit will be a one if the associated link is selected by the S/UNI-DUPLEX. In the event of an erroneous header or out of cell delineation state, the previous ACTIVE value is retained. |
| 3 | 5:0 | TREF[5:0] | The timing reference encodes a frequency signal (e.g. 8 khz) inband that is independent of the serial bit rate. TREF[5:0] binary value represents the number of high-speed link bytes after this one at which a timing reference edge is inferred. All ones indicates no timing mark associated with this cell. |

FIG. 3 -- EXAMPLE PREPENDED FIELDS

| Function | Codeword (left bit transmitted first) |
|---|---|
| Remote Defect Indication (RDI) | 11111111 00000000 |
| Loopback activate | 11111111 01000000 |
| Loopback deactivate | 11111111 00100000 |
| Remote reset activate | 11111111 01100000 |
| Remote reset deactivate | 11111111 00010000 |
| Reserved | 11111111 01010000 |
| . . . | . . . |
| Reserved | 11111111 00000100 |
| User Defined | 11111111 01000100 |
| . . . | . . . |
| User Defined | 11111111 00111110 |
| Idle Code | 11111111 01111110 |

*FIG. 4: ASSIGNED BIT ORIENTED CODES*

*FIG. 5 - UPSTREAM CELL OVERHEAD*

FIG. 6 - PHY BACK-PRESSURE

FIG. 7 - DOWNSTREAM CELL OVERHEAD

FIGURE 8 APEX BLOCK DIAGRAM

*FIGURE 9 VORTEX BLOCK DIAGRAM*

FIGURE 10 DUPLEX BLOCK DIAGRAM

METHOD AND APPARATUS FOR INTERCONNECTION OF FLOW-CONTROLLED COMMUNICATION

CROSS REFERENCE TO RELATED APPLICATIONS

This application is a continuation-in-part of Ser. No. 09/569,763 filed May 12, 2000.

This application claims priority from provisional patent application No. 60/134,959, filed May 19, 1999.

This application also claims priority from provisional patent application No. 60/136,680 filed May 28, 1999.

This application claims priority from patent application METHOD AND APPARATUS FOR AN OPTIMIZED DIGITAL SUBSCRIBER LOOP ACCESS MULTIPLEXER filed May 12, 2000 (which claimed priority from provisional application No. 60/134,119, filed May 14, 1999.)

Each of these applications are incorporated herein by reference.

Co-assigned U.S. Pat. No. 5,260,978, "Synchronous Residual Time Stamp for Timing Recovery in a Broadband Network," discusses a number of background issues related to the present invention.

FIELD OF THE INVENTION

The present invention is related to the field of digital communications. More specifically, the present invention is directed to methods and/or systems and/or apparatuses for providing enhanced flow control in digital signals.

BACKGROUND OF THE INVENTION

A number of prior art techniques have been proposed and developed for managing traffic in computer networks using flow control. Some references to known flow control implementations include:

1. ATM Generic Flow Control (GFC)—For UNI connections the first four bits of each ATM cell have been reserved for flow control. As in the present invention, the GFC were to communicate transmit-on/transmit-off (XON/XOFF) information, but unlike the present invention, this prior art flow control is applied to the entire link as opposed to a single virtual connection (VC).
2. BECN (Backward Explicit Congestion Notification)—This technique is per-VC flow control employed in ATM networks. The feedback is very slow (<10 updates per second); therefore, large cell buffers must be used in conjunction to avoid cell loss.
3. ATM Forum Available Bit Rate (ABR) service—Is based on specifying the ATM cell rate, as opposed to a simple XON/XOFF indication. ABR is more suited for end-to-end flow control within networks with large latencies. It lacks the simplicity of the present invention.
4. ATM Forum QFC—This is a credit based system. It lacks the simplicity of the present invention.
5. Transmission Control Protocol (TCP)—This is a Layer 4 end-to-end flow control (amongst other things) protocol.
6. T1 systems—The timing is extracted from the raw frame rate of the link. This imposes the burden that the clock for link itself be very well controlled. With the present invention, a suitable line rate clock can generated with a simple 3rd overtone crystal oscillator that free runs.
7. SONET systems—Again, synchronization is based on extracting timing from the frame rate.
8. SRTS—Synchronous Residual Time Stamp is a method for timing reference carriage across an ATM network. It generates a 4-bit remainder of the running phase difference between the source end clock and the network Stratum timing reference, transports this value to the receiving end, which then regenerates the source end clock from this 4-bit SRTS value and the Stratum reference.

The possibility of congestion is inherent in an access multiplexer, such as a DSLAM. In the downstream direction, the WAN link can generate a burst of cells for a particular modem at a rate exceeding the modem's bandwidth capacity. Therefore, feedback to the traffic scheduler is required to cause it to buffer and smooth cell bursts to prevent downstream buffer overflow.

In the upstream direction, the aggregate bandwidth of all subscribers can exceed that accommodated by the WAN uplink. Flow control is generally required in a multiple access system to ensure fair access to the up-link, to minimize cell or data loss, and to minimize the impact of greedy users on others.

In DSLAM systems, such as described in greater detail in the references cited above, flow control has been adapted for a variety of prior architectures. One class of known prior DSLAM solutions uses packet or cell switch architectures. This requires signaling and traffic management functionality on the access port line cards and on the WAN uplink port card. Additionally, intercard switching is typically required in these solutions. Some examples of such solutions are Transwitch-Cubit-based switch architectures, Motorola-MPC860SAR-based architectures, and IgT-WAC-185/186/187/188-based switch architectures.

An alternative prior solution centralizes signaling and traffic management functionality on the WAN uplink port card by applying a shaping function on a port basis to all traffic in the downstream direction. This per port shaping function shapes the aggregate traffic to a port (such as an xDSL modem) to handling rate of that port. This solution thereby attempts to eliminate the need for further traffic management functionality on the access port line cards.

Various of these prior DSLAM flow control techniques suffer from a number of disadvantages, such as:

1. Significant increased complexity results from providing the signaling and traffic management functionality on both the access port line cards and the WAN uplink port card. This occurs due to the large number of access port line cards in a typical DSLAM, therefore requiring a large number of physical instances of this complex and costly functionality.
2. Placing the signaling and traffic management functionality on each access port and WAN uplink card additionally adds the requirement to provide intercard switching capability. The intercard switching solution is generally complex due to the large number of access port cards.
3. Placing the signaling and traffic management functionality on each access port and WAN uplink card additionally forces a distributed software control and provisioning requirement, thus adding significant complexity to the software layer.
4. Traffic latency and delay variation is increased due to the traffic transiting two traffic management structures—one on the access port card and one on the WAN uplink card.

5. Solutions using per port traffic shaping to eliminate the need for traffic management functionality on the access line card, must adjust the shaping rate in real time, each time the access port changes rates. This will happen frequently when using rate adaptive splitterless xDSL technology.

6. Solutions using per port traffic shaping to eliminate the need for traffic management functionality on the access line card must ensure PHY buffer overflow is avoided. To do this, the shape rate must be less then the actual PHY rate, since the two rates are not synchronized. This rate difference represents a loss in throughput bandwidth.

SUMMARY OF THE INVENTION

The present invention is directed to providing improved flow control in certain digital communication environments. In various embodiments, the present invention may be embodied in devices, systems, and methods relating to digital communication.

In particular embodiments, the present invention may be most easily understood in the context of a Digital Subscriber Loop Access Multiplexer (DSLAM) architecture, such as the architecture described in the provisional applications referenced above. In particular embodiments, the present invention addresses issues that can arise in DSLAM architectures where the complexity of the system is concentrated in a few common cards, so that the multitude of line cards each are simple. In a particular example architecture, each XDSL signal has a relatively low bit rate and it is therefore technically feasible to perform ATM layer functions, such as traffic management, on a single entity. The invention, in particular embodiments, addresses a side-effect of removing traffic management queuing from individual line cards. This side effect is the need to pace the transfer of cells to the line card to avoid cell loss. The invention in specific embodiments uses a per-PHY flow-control mechanism to achieve this.

In specific aspects of specific embodiments, the invention provides a method of flow control in a digital communications system wherein data flows in one direction in a combined channel and in an opposite direction in multiple channels. In the combined channel, according to the invention, data units (such as cells or packets) have included in them a portion of data indicating available/not-available status of channels in the return direction. Before a channel in the return direction is selected for transmitting, the available/not-available status provided in the data portions is checked.

In further aspects, every data unit flowing in the combined channel contains such a portion. In a further aspect, each data unit only provides status of a subset of return channels and therefore multiple data units are needed to update the status of all return channels.

In a further aspect, there is a delay of one or more data units between the status provided in the portion and when the return scheduler receives the status portion and therefore sufficient buffering is provided one at the on said second channels to compensate for said delay.

In specific embodiments, portions can be encoded as a set of bit-flags, the state of each bit flag indicating available/not-available status of one of said channel in the return direction.

It will thus be seen that in specific embodiments, the invention provides a solution enabling real time PHY buffer status feedback. This eliminates the need for per port traffic shaping on an uplink card and further in various embodiments enables: (1) real time, automatic adjustment to PHY rate changes, thus avoiding PHY buffer overflow conditions which result in traffic loss and throughput inefficiency; (2) less complex traffic management functionality on the WAN uplink card due to removal of the per port traffic shaping function; and (3) maximization of the PHY bandwidth capability, since the port traffic is played out at the current maximum PHY rate. In various specific embodiments, the invention further: (1) is economically and technically scaleable; (2) has low latency to the feedback to avoid instabilities or need for extensive buffering; (3) has low bandwidth overhead for in-band and minimizes signal paths if out-of-band: and (4) uses flow control to avoid creating head-of-line blocking situations.

Other aspects of the present invention include a method for providing a timing reference over a data unit stream that allows frequency matching to any frequency less than the data unit transmission rate.

As used herein, cells should be understood to refer to ATM cells or to any other communications protocol data unit (such as packets or frames) that may be transmitted or scheduled as described by or understood from the teachings provided herein.

While the present invention is described herein in terms of a particular ATM system embodiment, using the teachings provided herein, it will be understood by those of skill in the art, that various methods and apparatus of the present invention may be advantageously used in other communication systems, including different ATM systems and systems based on different communications protocol, such as Ethernet, SONET, etc.

The invention will be better understood with reference to the following drawings and detailed descriptions. In different figures, similarly numbered items are intended to represent similar functions within the scope of the teachings provided herein.

Furthermore, it is well known in the art that logic systems can include a wide variety of different components and different functions in a modular fashion. Different embodiments of a system can include different mixtures of elements and functions and may group various functions as parts of various elements.

For purposes of clarity, the invention is described in terms of systems that include many different innovative components and innovative combinations of components. No inference should be taken to limit the invention to combinations containing all of the innovative components listed in any illustrative embodiment in this specification.

All publications, patents, and patent applications cited herein are hereby incorporated by reference in their entirety for all purposes.

DESCRIPTION OF SPECIFIC EMBODIMENTS

1. Flow Control

In particular embodiments, the invention is particular concerned with flow control in a communication system. Flow control, according to broad embodiments of the invention, can be effectively performed on serial links, but is independent of whether the interconnection is a parallel bus or serial link.

Figure 1:
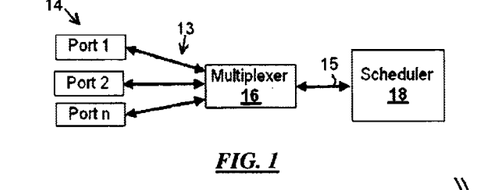
FIG. 1 shows a simple example block diagram circuit in which a method according to the invention can be performed.

FIG. 1 shows a simple example block diagram circuit in which a method according to the invention can be performed. This figure represents a simple architecture which could employ a method according to the invention. Sho en in the figure is a scheduler 18, a number of ports or channel terminations 14, and a multiplexing function 16 that in both directions translates between a combined data unit stream 15, and a plurality of parallel data streams 13.

Flow control according to the current invention can be performed in a "downstream" direction from a high-speed scheduler towards a number of downstream channels. In such a system, the scheduler has to determine to which channel to send a downstream data unit and has to be careful not to overload the capacity of the downstream channels. According to the invention, there is provided a combined upstream data unit stream 15 from the channels to the scheduler. According to the invention, data units in the upstream stream have included into them a data portion (such as a prepended or postpended field) that indicates available/not-available status of a number of downstream channels. This portion can be added by a device such as multiplexer 16, which is in communication with each of ports 14. A scheduler uses this data to determine to which channel to send a dowstream cell. Typically, this decision consists of two steps: first any channel that is presenting a far-end not-available status is eliminated from the scheduling round. If all far-end channels are not available, a stuff cell may be generated. Otherwise, a simple round robin algorithm or any other scheduling algorithm may be used among the remaining eligible channels to share the downstream link and schedule the next cell to be sent.

In a further aspect, it is recognized that there is a delay in a scheduler learning of the not-available status of a downstream channel. Therefore, according to the invention, downstream channels are designed able to handle a number of data units after a not-available status is signaled. For example, a downstream channel may signal not-available whenever it has only three free data unit buffers remaining, thus the channel is able to accept three data units after signaling a not-available status.

2. Timing Reference

In a further aspect, the present invention provides a means for carrying a timing reference frequency in a serial data unit stream. This frequency reference transport mechanism is believed to be unique in that it operates independently of the serial link bit rate. According to the invention, the timing reference is carried inband to avoid the need for additional interconnection for the function.

Transmitting a reference frequency is known in the art and generally referred to as "network synchronization." As will be recognized in the art, digital communication networks of many designs operate optimally when all the entities in the network have a bit rate that is derived from one source. This aspect of the present invention allows a reference frequency (generally provided by an external signal) to be propagated in a data stream to different components in a communication system.

According to this embodiment, data units transmitted over a serial link contains a timing reference field (TRF). Although in one embodiment, the timing reference is targeted at a typical need of transporting an 8 kHz signal, any frequency less than the cell rate is permissible.

The TRF in a cell indicates during which byte reception in that cell a next edge occurs in the timing reference signal. In specific embodiments, the TRF value indicates the number of bytes relative to the start of the cell wherein the edge occurs. (A flag value, such as all ones, indicates no edge occurs during a particular data unit.) Thus a circuit or module receiving a byte stream of protocol data units can recreate a reference frequency.

In particular embodiments, the recovered timing event at the receiving is generated one cell period later than it was inserted at the transmitting end, with a resolution of one byte. Because of the limited resolution, some jitter is present in the recovered reference frequency. In particular embodiments, an external local high-Q phase locked loop (PLL) can be used to remove the jitter.

Aspects of the present invention have thus far been described in terms of general methods and devices. The previous description and claims are believed to be a full and complete description sufficient to allow an ordinary practitioner in the art to make and use the invention as described. It will be understood to those of skill in the art from the teachings provided herein that the described invention can be implemented in a wide variety of specific programming environments and communications systems using a wide variety of programming languages (such as SQL, Visual Basic, Pascal, C++, Basic, Java, etc.) and wide variety of file or communications formats.

What follows are descriptions of example systems and methods that embody various aspects of the present invention and that include additional novel aspects. This following discussion is included, in part, in order to disclose particularly preferred modes presently contemplated for practicing the invention. It is intended, however, that the previous discussion and the claims not be limited by examples provided herein. It is further intended that the attached claims be read broadly in light of the teachings provided herein. Where specific examples are described in detail, no inference should be drawn to exclude other examples known in the are or to exclude examples described or mentioned briefly from the broad description of the invention or the language of the claims. It is therefore intended that the invention not be limited except as provided in the attached claims and equivalents thereof.

3. Example System Implementation

In specific aspects, the present invention may be further understood in the context of operation of a specific architecture for digital communications. This example architecture is described in above referenced applications and is referred to at times as embodied in the assignee's products VORTEX™, DUPLEX™, and APEX™, which are particular logic implementations that may include aspects of the present invention. However, the invention has applications in various communication system architectures and is intended to not been limited except as provided by the attached claims. To facilitate understanding, the following discussion includes many details of operation of a particular example VORTEX and DUPLEX modules. These details are not elements of all embodiments of the present invention, which should not be limited except as provided in the attached claims.

As described in greater detail in above referenced documents, a particular DSLAM architecture provides interconnection between line cards and an uplink processor via serial links. (Serial, as used herein and as commonly understood in the ATM art, can include multi-line serial connections, such as a four-wire serial ATM cell connection. In this usage, serial refers to the transmission of cells or portions of cells one after the other, even if some bits are transferred in parallel to improve speed. In a particular embodiment, the serial connections comprise two twisted pair connections, one in the upstream direction and one in the downstream direction, each twisted pair transmitting a serial bit-stream as understood in the art.

Figure 2:
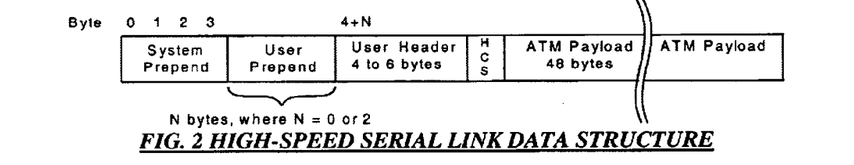
FIG. 2 shows an example format for a link data structure according to specific embodiments of the invention.

Data to and from the line cards are transferred on these high-speed links. (In an example embodiment, serial link transceivers support UTP-5 cable lengths up to 10 meters.) Typically, to avoid clock skew issues, a separate clock is not transmitted and the receivers recover a local clock from the incoming data. In a system according to the invention, the serial links typically carry data units (such as ATM cells or other addressed packets, such as Ethernet packets) with prepended bytes. An example cell format is illustrated in FIG. 2. A WAN uplink processor (such as in VORTEX) appends the first four bytes and a Header Check Sequence (HCS) byte in the downstream direction and strips them off and parses them in the upstream direction. With respect to the VORTEX and DUPLEX, the remainder of the bytes in the data structure may be transferred transparently. In a specific embodiment, the bytes are serialized most significant bit first, the bit stream is a simple concatenation of the extended cells, and cell rate decoupling is accomplished through introduction of stuff cells.

In a particular implementation and embodiment, the transmitter inserts a correct CRC-8 that protects both the ATM cell header and prepended bytes in the HCS byte. The receiver uses the HCS byte for delineation. Failure to establish cell alignment results in a loss of cell delineation (LCD) alarm. The entire bit stream is scrambled with a $x^{43}+1$ self-synchronous scrambler.

Figure 3:
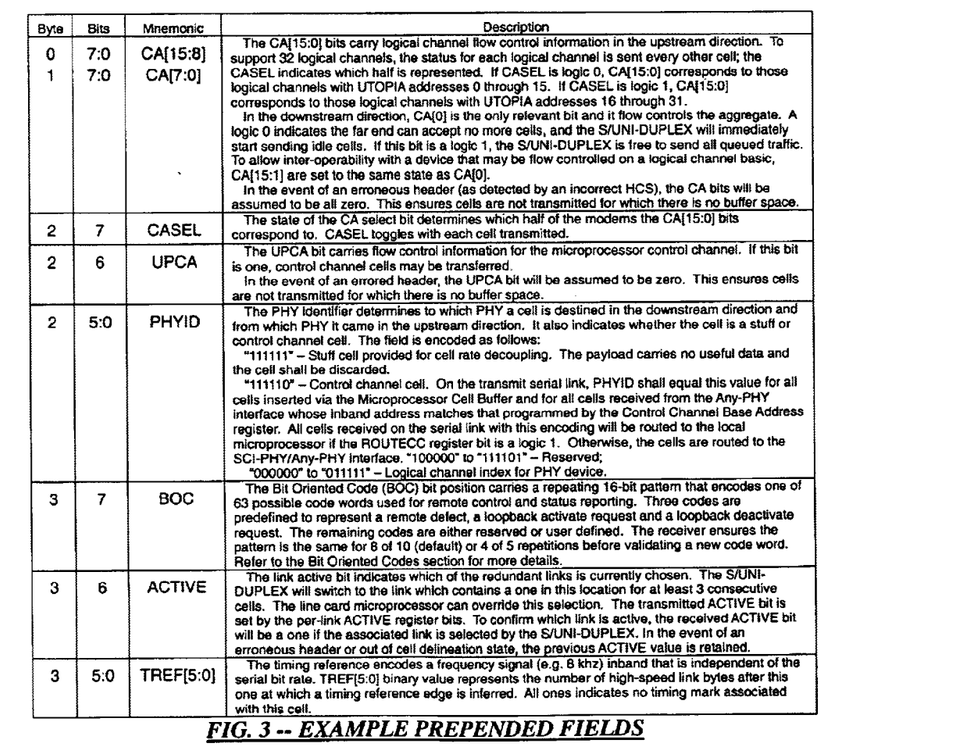
FIG. 3 is a table illustrating an example format for prepended filed values according to specific embodiments of the invention.

FIG. 2 shows an example of a High-Speed Serial Link Data Structure that may be employed according to an embodiment of the invention. FIG. 3 is a table illustrating an example format for prepended filed values according to specific embodiments of the invention.

Figure 5:
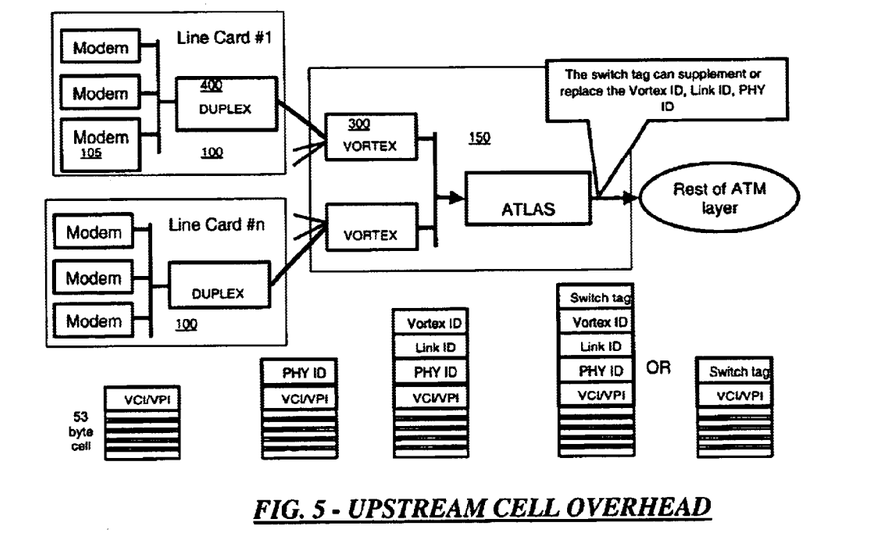
FIG. 5 is a block diagram showing example upstream data unit transfer architecture and cell overhead according to specific embodiments of the invention.

FIG. 5 is a block diagram showing example upstream data unit transfer architecture and cell overhead according to specific embodiments of the invention. As shown in the figure, in the upstream direction, line cards 100 add header information to cells by operation of DUPLEX 400. This overhead is used at the VORTEX 300 to perform downstream scheduling. The VORTEX adds additional overhead to upstream cells, which may be used in further upstream processing.

Figure 6:
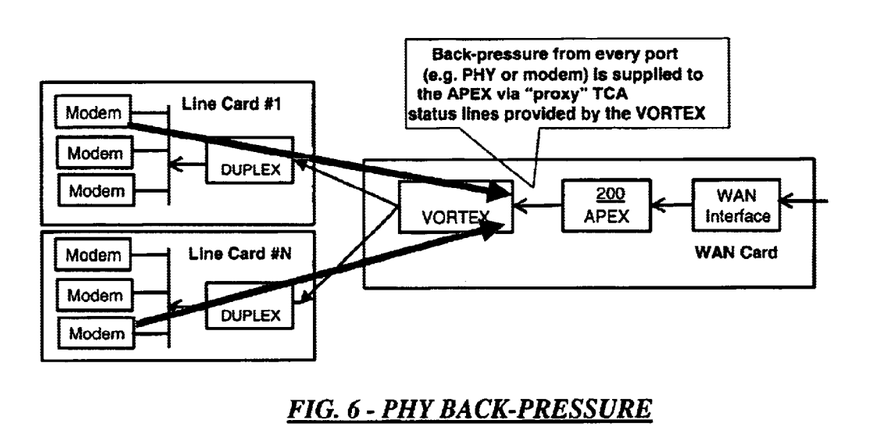
FIG. 6 shows a back-pressure architecture according to specific embodiments of the invention.

FIG. 6 shows a back-pressure architecture according to specific embodiments of the invention. This back-pressure is transmitted to APEX 200, by VORTEX 300, and is exerted through the operation of the status data in the VCI/VPI prepend transmitted in the upstream cells.

Figure 7:
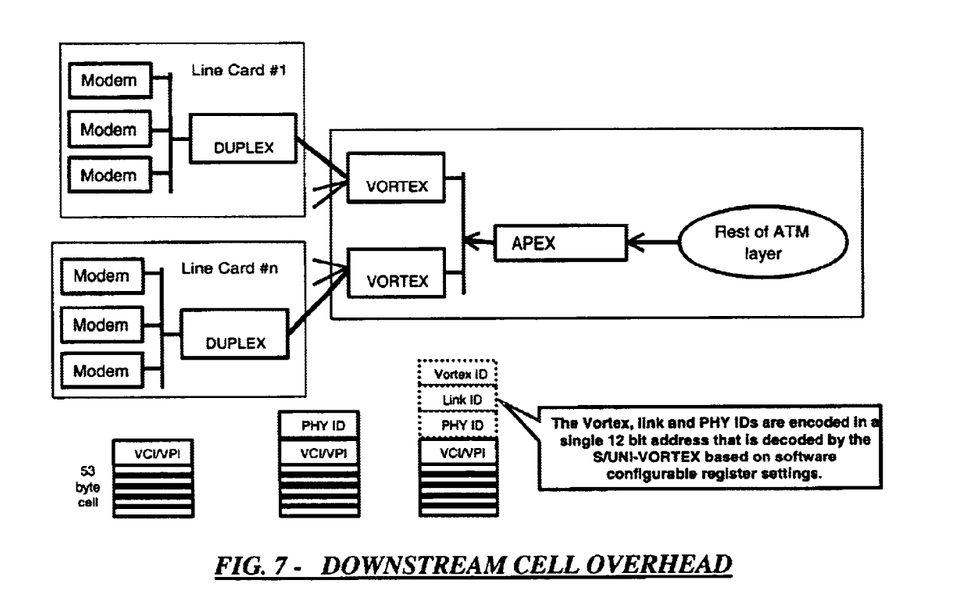
FIG. 7 is a block diagram showing example downstream data unit transfer architecture and cell overhead according to specific embodiments of the invention.

FIG. 7 is a block diagram showing example downstream data unit transfer architecture and cell overhead according to specific embodiments of the invention. As shown in the figure, the various Vortex ID, Link ID, and PHY ID are decoded by the VORTEX and the cells are placed by the Vortex on the appropriate serial connections to the line cards.

3.1. Link Integrity Monitoring

Although the serial link bit error rate can be inferred from the accumulated Header Check Sequence (HCS) errors, the option exists to perform error monitoring over the entire bit stream. When the feature is enabled the second User Prepend byte transmitted shall be overwritten by the CRC-8 syndrome for the preceding cell. The encoding is valid for all cells, including stuff cells. The CRC-8 polynomial is $x^8+x^2+x+1$. The receiver generally raises a maskable interrupt and optionally increments the HCS error count. Simultaneous HCS and cell CRC-8 errors result in a single increment.

3.2. Bit Oriented Codes

A system according to the invention in specific embodiments uses Bit-Oriented Codes (BOCs). Such coding was previously known in T1 transmission systems and is described in ANSI T1-403-1995. This function was implemented with circuits (i.e. XBOC and RBOC) designed in approximately 1989. However, according to the current invention, BOC functionality is adapted to DSLAM-type multiplexing and to an ATM environment.

In a particular embodiment, Bit Oriented Codes (BOCs) are carried in the BOC bit position in the System Prepend. The 63 possible codes can be used to carry predefined or user defined signaling or control status. Bit oriented codes can be transmitted as a repeating 16-bit sequence consisting of 8 ones, a zero, 6 code bits, and a trailing zero (111111110xxxxxx0). The code to be transmitted is programmed by writing the Transmit Bit Oriented Code register. The autonomously generated Remote Defect Indication (RDI) code, which is generated upon a loss-of-signal or loss-of-cell-delineation, takes precedence over the programmed code. RDI insertion can be disabled via the RDIDIS bit of the Serial Link Maintenance register. RDI can be inserted manually by setting the Transmit Bit Oriented Code register to all zeros.

A receiver can be enabled to declare a received code valid if it has been observed for 8 out of 10 times or for 4 out of 5 times, as specified by the AVC bit in the Bit Oriented Code Receiver Enable register. Unless fast declaration is necessary, it is recommended that the AVC bit be set to logic 0 to improve bit error tolerance. Valid BOC are indicated through the Receive Bit Oriented Code Status register. The BOC bits are set to all ones (111111) if no valid code has been detected. A maskable interrupt is generated to signal when a detected code has been validated, or optionally, when a valid code goes away (i.e. the BOC bits go to all ones). When the receiver is out of cell delineation (OCD) and the Receive Bit Oriented Code Status register will produce all ones (111111).

Figure 4:
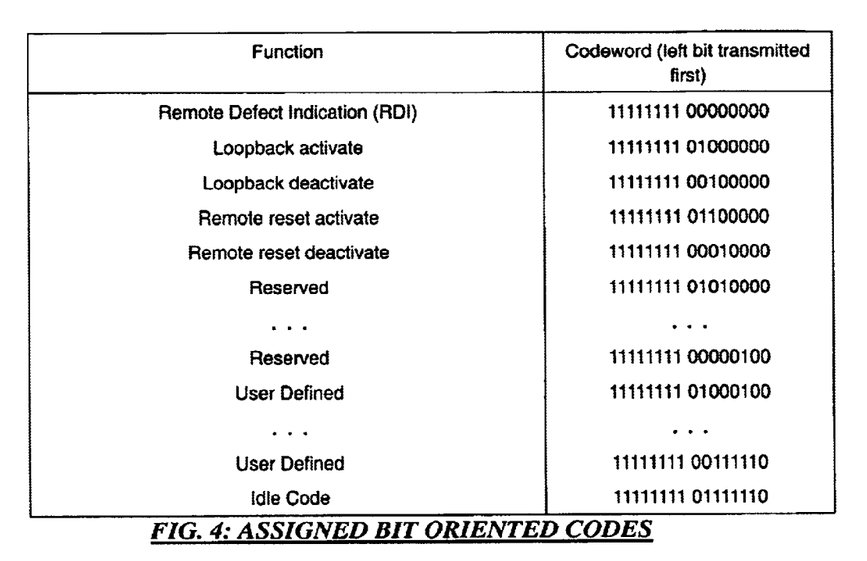
FIG. 4 is a table illustrating an example format for assigned bit oriented codes according to specific embodiments of the invention.

Valid codes in one specific embodiment are provided in the table shown in FIG. 4. Reserved codes anticipate future enhanced feature set devices. User Defined codes may be used without restriction. Regardless of definition, all 63 codes may be validated and read by a microprocessor.

3.3. Loop Back

The RXDn+/– data is looped back onto TXDn+/– at the end of the reception of a loopback activate code. For the loopback to be enabled, the loopback code is first validated (received 8 out of 10 times at least once) and then invalidated, typical by reception of another code. The loopback is not enable upon initial validation of the loopback activate code because the looped back signal, which still contains the original loopback activate command, would cause the far-end receiver to go into metallic loopback, thereby forming an undesirable closed loop condition. The loopback is cleared immediately upon the validation of the loopback deactivate code, assuming the MLB register bit is logic 0.

To produce a loopback at the far end, one programs the Transmit Bit Oriented Code register with the loopback activate code for at least 1 ms and then reverts to another (typically idle) code. Upon termination of the loopback activate code, the data transmitted on TXDn+/– is expected to be received verbatim on the RXDn+/– inputs. When transmitting a loopback activate code, it is recommended the RDIDIS register bit be set to logic 1, or else a loss-of-signal or loss-of-cell-delineation event, would cause a premature loopback due to a preemptive Remote Defect Indication (RDI) code being sent.

The remote reset activate and deactivate code words are supported by a line card device (DUPLEX). The uplink can send the reset activate code to cause the line card device to assert its active low RSTOB output. The deactivate code causes deassertion of RSTOB.

The Remote Defect Indication (RDI) is sent whenever Loss of Signal (LOS) or Loss of Cell Delineation (LCD) is declared. This code word takes precedence over all others.

3.4. Cell Delineation Process

As described in the above-referenced documents, the VORTEX performs HCS cell delineation, payload descrambling, idle cell filtering and header error detection to recover valid cells from the receive high-speed links. These functions are performed in the spirit of ITU-T Recommendation I.432.1, but support 9 to 13 byte cell headers. For additional information, refer to the above referenced documents.

3.5. Protection Switching Protocol (Fault Tolerance Architectural Elements)

In a further aspect, the VORTEX and its sister device, the DUPLEX inherently support system architectures requiring fault tolerance and 1:1 redundancy of the system's common equipment. In point-to-point backplane architectures such as these, the 1:1 protection also includes the associated serial links (also referred to as Low Voltage Differential Signal or LVDS) connecting the common equipment to the line cards. VORTEX and DUPLEX perform clock recovery, cell delineation, and header error monitoring for all receive high-speed serial links simultaneously. The maintained error counts and alarm status indications may be used by the control system to determine the state and viability of each serial link.

In these architectures, a DUPLEX will be connected to two VORTEXs, one on the active common card and one on the spare common card. Upon a failure of the active card, the spare card becomes the conduit for traffic. The VORTEX facilitates link selection upon start-up as well as switching between links upon failure conditions.

Typically a centralized resource or cooperating distributed microprocessor subsystems will determine which common card is to be considered active for each downstream DUPLEX. One key to link selection lies in how the "ACTIVE" bit is handled by the VORTEX and DUPLEX. The control system uses the ACTIVE bit within each of the 8 Serial Link Maintenance registers to independently set the state of each link's ACTIVE status. The current state of the link's ACTIVE bit is sent downstream once per transmitted cell. The ACTIVE status is debounced and acted upon by the DUPLEX. The DUPLEX will only accept data traffic from one of its two serial links, and normally it is the link marked ACTIVE that is considered to be the working link. However, the DUPLEX can override this using local control. Thus, although the VORTEX may indicate the ACTIVE and spare links, it is actually the DUPLEX that must effect the protection switching.

The DUPLEX reflects back an ACTIVE bit status to indicate the link chosen as active. This reflected ACTIVE bit does not have a direct affect on the VORTEX, but its status is debounced (must remain the same for 3 received cells) and then stored by the VORTEX in the Receive High-Speed Serial Cell Filtering Configuration/Status register. The reflected status can be used by the local control system to confirm receipt of the ACTIVE status by the DUPLEX.

4. Data Buffering and Flow Control

Upstream and downstream flow control according to the present invention (and also flow control as implemented in a particular version of the VORTEX) can be further understood in the context of an overall system, including the role played by the line-card devices (such as eight DUPLEX devices in a particular implementation) connected to the uplink. Portions of VORTEX & DUPLEX TECHNICAL OVERVIEW are reproduced below. For additional information, the reader is referred to above-referenced documents and to PMC-Sierra's VORTEX & DUPLEX TECHNICAL OVERVIEW.

Below is further described cell buffering and flow control aspects according to specific embodiments of the present invention, using as an example elements of a particular implementation of VORTEX and DUPLEX logic. While this specific example implementation uses serial links, flow control, according to broad embodiments of the invention, is independent of whether the interconnection between the line cards and uplink cards is a parallel bus or serial link and only presumes an upstream data unit stream. In specific embodiments, aspects of the invention are optimized to use serial links. In a particular VORTEX and DUPLEX, serial links were chosen because they are more scaleable and reliable than parallel buses.

4.1. Downstream Traffic Flow Control

A particular embodiment of the VORTEX has 33 one-cell-deep buffers for each of the 8 downstream serial links. Below is described how, on a per link basis, the VORTEX schedules cells out of these 33 cell buffers and transmits them on their serial link. An individual link is described here, but the reader is reminded that in one embodiment of the invention, there is no scheduling interaction or interdependence among the 8 serial links—each has its own 33 cell buffer and each has its own scheduler. Therefore, extending the described method to multiple links will be apparent from the teachings provided herein.

Downstream scheduling occurs when the previous cell has been fully transmitted over the downstream link. In other words, once a cell (data or stuff cell) has been scheduled the entire cell is sent before another cell is scheduled. Cells are transmitted back to back, without a substantial gap. The scheduling event according to the invention happens quickly enough that there is no added cell transmission delay. When there is no buffered data in any of the 33 buffers for a particular serial link, the VORTEX generates a stuff cell and sends it on the link. A stuff cell meets all the requirements of a standard data cell, including valid system overhead information, but stuff cells are discarded by the far-end receiver.

When there are one or more non-empty buffers for a link, a scheduler (in VORTEX, sometimes referred to as a core card scheduler, or uplink scheduler) must decide which of the far-end channels (in the example, up to 32 PHYs or ports plus the microprocessor port) should have its buffered cell scheduled onto the downstream link. This decision consists of two steps: first any channel that is presenting a far-end buffer full status (one example of how this may be done is described below) is eliminated from this scheduling round. If all far-end channels have full buffers, a stuff cell is generated and transmitted. Otherwise, a round robin algorithm is used (though any other access algorithm could be used) among the remaining eligible channels to share the downstream link fairly and schedule the next cell to be sent.

4.1.1. Upstream Signaling of Downstream Status

In a specific implementation, as shown in FIG. 3, each cell transmitted over each of the upstream serial links contains a portion (in one example, 16 bits, labeled CA[15:0]) of information that convey the far-end cell buffer status (full or not full) for 16 of the active PHYs (there are generally a total of 32 for each serial link) supported on each link. Therefore, in this embodiment, after two cells are received on the upstream link the downstream buffer status of all 32 far-end PHYs has been updated. In a specific embodiment, a separate overhead bit per cell conveys the buffer status of the far-end microprocessor port. In this embodiment, therefore, at any given instant a (VORTEX) scheduler is using information that is either one or two cells out of date. Therefore, a far-end device (typically the DUPLEX) generally will have enough per-PHY buffer space to accommodate the slight delay in conveying the "buffer full" information to the scheduler. The scheduler uses the full or not full information to determine which channels should be involved in the current round of scheduling, as discussed above.

4.2. Upstream Traffic Flow Control

The upstream traffic flow control within the VORTEX allows for some system engineering flexibility. When the system is engineered such that maximum aggregate burst upstream bandwidth is less than or equal to the link and device bandwidth at each stage of concentration, congestion will not occur prior to upstream traffic queuing in the TM (traffic manager) device. (Upstream queues could congest due to restricted up-link capacity, in which case appropriate congestion management algorithms within the TM device should be invoked.) In this case, upstream traffic flow control is unnecessary and need not be utilized in DUPLEX or VORTEX type devices.

However, when a system is engineered such that upstream burst bandwidth capacity can exceed the link and bus bandwidth then (depending on parameters such as the over subscription employed, misbehaving users, or traffic burst scenarios) congestion at the upstream uplink (e.g. VORTEX) buffers can occur. To ensure that these buffers do not overflow, upstream traffic flow control is implemented according to further aspects of the invention (in a specific implementation by the VORTEX and DUPLEX).

Unlike the downstream direction, the upstream direction does not require per channel buffering or per channel buffer status indication. In the VORTEX, each of the (eight) upstream serial links is provided with a simple six cell FIFO. The SCI-PHY/Any-PHY bus slave state machine services the FIFOs with a weighted round-robin algorithm and presents the data to the upstream bus master as a single cell stream.

In aggregate, the 8 upstream links can burst data into the VORTEX at up to 1.6 Gb/s, which is twice the maximum bandwidth of the upstream bus. Further, the bus master may be servicing several VORTEX devices at once or be otherwise restricted in the maximum sustained bandwidth it is able to receive from the VORTEX. Therefore, the potential to overflow one or more of the 6 cell upstream FIFOs is a real possibility.

Therefore, when any upstream FIFO has less than three empty cell buffers, it deasserts the cell available (CA[0]) bit sent in the system overhead of the corresponding downstream serial link (see FIG. 3). It is the responsibility of the far end device (typically a DUPLEX) to start sending stuff cells immediately upon indication that the VORTEX can accept no more traffic. By setting the full mark at three cells, the VORTEX allows for two additional cells to be accepted after CA[0] is deasserted. This accommodates far-end latency in reaction to the CA[0] indication.

4.3. Timing Reference Insertion and Recovery

In a further aspect, the system design provides a means for carrying a timing reference frequency in a serial data unit stream. This frequency reference transport mechanism is believed to be unique in that it operates independently of the serial link bit rate. According to the invention, the timing reference is carried inband to avoid the need for additional interconnection for the function.

The reason for wanting to carry a reference frequency is known in the art and generally referred to as network synchronization. As will be recognized in the art, digital communication networks of particular design operate optimally when all the entities in the network have a bit rate that is derived from one source. This aspect of the present invention allows a reference frequency (generally provided by an external signal) to be propagated in a data stream to different components in a communication system.

The high-speed serial links are capable of transporting a timing reference in both directions, independent of the serial bit rate. As shown in FIG. 3, every cell transmitted over the serial link contains a timing reference field called TREF [5:0]. Although the timing reference is targeted at a typical need of transporting an 8 kHz signal, its frequency is not constrained to 8 kHz. Any frequency less than the cell rate is permissible.

In the transmit direction, rising edges on a TX8K input (an externally provided reference frequency) are encoded in the cells transmitted on all eight serial links. For each of the serial links, the rising edge of TX8K causes an internal counter to be initialized to the cell length minus 1. The counter decrements with each subsequent byte transmitted until the fourth byte of the next cell with prepend, at which point the state of the counter is written into the outgoing TREF[5:0] field. If no rising edge on TX8K has occurred, TREF[5:0] is set to all ones.

In the receive direction, the VORTEX is typically receiving cells from a DUPLEX device, which implements the same TX8K process described above. As determined by the value of the RX8KSEL[2:0] bits in a Master Configuration register (this value indicated the serial link from which a timing reference will be recovered), the timing signal received over one of the eight serial links is recreated on RX8K, which may be output by the VORTEX to other system components.

The VORTEX monitors the TREF[5:0] field on the selected upstream serial link and initializes an internal counter to the value of TREF[5:0] each time the field is received. The counter decrements with each subsequent byte received. When the count becomes zero, a rising edge is generated on RX8K. If the value of TREF[5:0] is all ones, RX8K remains low. RX8K is left asserted for two high speed (REFCLK) reference clock periods, and then it is deasserted.

The recovered timing event is generated one cell period later than the inserted timing with a resolution of one byte. Because of the limited resolution, some jitter is present. At a link rate of 155.52 Mb/s, 52 ns of peak-to-peak jitter will occur on RX8K. An external local high-Q phase locked loop (PLL) can be used to remove the jitter.

5. Further Details of Operation of Duplex and Vortex

This section describes in further detail how a VORTEX and DUPLEX can implement a flow controlled data path according to specific embodiments of the present invention, between the line cards and the core card(s).

5.1. Multiplexing on the Line Card (Stage 1 Multiplexing)

As long as the PHY devices are Utopia L2 compliant, there will be no glue logic or external circuitry needed to interface the DUPLEX to the logical PHY devices. Using the SCI-PHY Utopia extension (as defined by PMC-Sierra) up to 32 PHY devices can be served. Because the DUPLEX is a mixed analog/digital device with integrated clock synthesis unit (CSU) and clock recovery unit (CRU) there is no external circuitry needed to support the high speed serial interface between the DUPLEX and VORTEX. In this way, parts count and board area on the line card is kept to an absolute minimum.

5.1.1. Upstream (to tie Core Card) Traffic Control on the Line Card

A single parallel data bus (e.g. Utopia L2) is used to connect all PHY or multi-PHY devices to the DUPLEX. The PHYs are slave devices, the DUPLEX is the Utopia bus master. The bus is normally 8 bits wide with a maximum clock rate of 25 MHz (i.e. maximun 200 Mbps bus bandwidth), although a 16-bit, 33 MHz bus is also supported.

As bus master, the DUPLEX continuously polls the Receive Cell Available (RCA) status lines of each PHY, reading cells from the PHYs as they become available. Once a cell is brought into the DUPLEX the cell is tagged (via a prepend byte) with the appropriate PHY ID (0:31) and sent simultaneously to both core cards (active and standby) over the DUPLEX's two high speed serial links.

For the applications being targeted by this architecture, the 200 Mbps bandwidth capacity of the Utopia bus and the serial link is greater than the aggregate maximum upstream bandwidth of the PHYs. (For example, a line card with 32 E1 ports would, worse case, cause an upstream burst of only 64 Mbps. For DSLAM applications based on ADSL modems, the worse case upstream bandwidth requirement is even less.) Hence, there is no need for extensive buffering in the DUPLEX. (Though in one implementation, the DUPLEX does have minimal internal cell buffer in the upstream direction. This buffering improves throughput by ensuring that cell transfers from the Utopia bus to the serial link can occur back-to-back without idle periods on the link.) The internal four cell FIFO required on all Utopia compliant PHYs ensures that each modem can buffer cells while it waits for the DUPLEX to service it.

Since the serial link to the core card is not shared by any other line cards there is no need to conserve bandwidth by implementing port-to-port switching on the line card. Leaving all switching functions on the core card greatly simplifies the hardware and software requirements of the line card. This is one of the fundamental advantages of using a point-to-point interface between the line card and core card rather than, for example, a shared bus architecture where multiple line cards share a high speed bus.

In summary, in particular embodiments, the upstream data path on the line card operates according to the following:

1. Upstream cells are received by the PHY device and buffered until the DUPLEX reads them;
2. The connection between the PHYs and the DUPLEX may be a standard connection, such as Utopia L2;
3. PHYs operate as bus slaves, the DUPLEX operates as bus master;
4. After a cell is transferred from the PHY to the DUPLEX, it is tagged in the DUPLEX with a PHY ID and is sent to the active (and simultaneously to the standby core card where it is present) via point-to-point serial links.

5.1.2. Downstream (to the Line Card) Traffic Control on the Line Card

Downstream traffic is sent to the line card from the core card over the serial link. Where a redundant link is present, a line card (DUPLEX) will only accept cells from the serial link that has identified itself as "active" via an embedded control signal, though user cells on the inactive link are monitored for errors and then discarded and any embedded control channel cells received on the inactive link are sent to the microprocessor port. This allows the core cards to control when protection switching between serial links (and hence core cards) occurs. (If a distributed control architecture is desired, the line card's microprocessor can override the active channel selection via a control register.)

All downstream cells will have been tagged on the core card (by the ATM layer device) with a prepend (0:31) that identifies for which PHY the cell is tagged. For each cell it receives, the DUPLEX strips off the prepend, leaving just the original cell. It temporarily buffers the cell in a shallow (in one example, four cells per PHY) internal FIFO. This creates full "cell rate decoupling" between the Utopia bus and the serial link. Therefore the bus and the link can be clocked asynchronously.

As bus master, the DUPLEX continuously polls a Transmit Cell Available (TCA) status lines of all PHYs for which it has a downstream cell buffered. When a PHY has room (e.g. when the TCA is asserted), the DUPLEX sends the next buffered cell to the PHY (in a specific implementation over the Utopia bus).

To prevent its internal buffers from overflowing the DUPLEX implements per-PHY back-pressure flow control, as described above. Back-pressure signaling is sent to the VORTEX via embedded overhead on the upstream serial link. The DUPLEX indicates back-pressure for a PHY if the corresponding internal FIFO is holding two or more cells. Because buffering and back-pressure are implemented independently on a per-PHY basis, no head of line blocking occurs.

In summary, in particular embodiments, the downstream data path on the line card operates according to the following:

1. The DUPLEX receives downstream cells on the active serial link, strips off the PHY ID and places the cells in an internal per-PHY buffer.
2. The DUPLEX sends per-PHY back-pressure to the VORTEX via the serial link whenever the corresponding internal buffer begins to fill.
3. For each PHY with a non-empty buffer, the DUPLEX continuously polls the PHY's TCA line and sends a cell over the Utopia bus once the PHYs TCA status is asserted (i.e. when the PHY has room in its internal transmit cell buffer).

5.2. Connecting Line and Core Cards (Stage 2 Multiplexing)

In a particular embodiment, inter-card communication between the line cards and the core cards is carried on the serial links (physically, 4-wire high-speed links in one embodiment). No additional wires, clocks, or signals are required between cards. Physically, the serial transceivers are designed to connect directly to backplane traces or 4-wire (preferably shielded twisted pair) cables up to 10 meters in length. No external drivers are required. The high speed internal transmit clock of the serial link is synthesized from a lower (1/8) speed reference clock. The serial receiver recovers its clock from the incoming data, so both the Tx and Rx clocking of the serial links can be fully asynchronous to the clocking of the Utopia bus.

This section discusses the data path and flow control aspects of the inter-card communications; later sections discuss the inter-card communication channel, clock, timing, and other signals that are carried by the 4-wire serial connection.

The serial links carry user cells "clear channel" by appending extra bytes to each cell in order to carry all system information. Idle (or stuff) cells are automatically injected when no user data is present to ensure that continuous link error monitoring is available. Loss of receive signal (LOS) and loss of frame (LOF) interrupts are provided, as is far end notification of LOS and LOF conditions. Error cell and user data cell counters are also provided to assist in link performance monitoring.

In systems with redundant elements, each DUPLEX will be connected to two VORTEX devices, one on the active core card and one on the standby core card. Each VORTEX is capable of terminating 8 serial links from 8 DUPLEX devices. Each of the 8 links is independently configurable as active or standby, so a core card can simultaneously act as the active path for one line card but the inactive path for another line card. This allows load sharing between the two core cards and their associated WAN up-links. Load sharing allows each of the two WAN up-links to, under normal operating conditions, carry full traffic loads. Under failure conditions the total up-link bandwidth would be reduced by 50%.

The serial links have been designed to support the removal and insertion of cards while the equipment is powered up and carrying traffic. This, for example, allows all traffic to be moved to one core card while the second, standby core card is upgraded or serviced. This "hot swap" capability is a one feature of the point-to-point interconnect architecture.

For systems with greater than 8 line cards, several VORTEX devices may be placed on each core card. They share a 16 bit wide, 50 MHz ANY-PHY bus with the ATM layer devices such as the APEX and the ATLAS described in the above cited references. The VORTEX devices are bus slaves on this bus. To the bus master, each VORTEX looks like a multi-PHY device supporting up to 264 logical PHYs (8 links times 32 PHYs per link, plus 8 control channels, one per link).

5.2.1. Upstream (to the Core Card) Traffic Flow Control on the Core Card

In a typical access concentrator the WAN up-link will operate at an OC-3 rate or below (i.e. <155 Mbps) while the aggregate upstream burst bandwidth of the PHYs can be much higher. In order to smooth out the upstream traffic bursts with no or minimal loss of traffic there must be buffering and traffic management somewhere in the access concentrator. This is typically handled by a traffic management device such as an APEX.

Various Options

The issue of where upstream traffic buffers are placed in the system architecture is an important one that deserves further discussion. In its simplest form, the system designer of an access multiplexer or switch is faced with three choices: put buffering on the line card and only pull upstream traffic off each line card when the WAN up-link can take it, or pull the upstream traffic off the line card immediately and buffer it on the core card, such as done by the VORTEX and DUPLEX, or put buffering on every card (often done when there is a separate switch fabric between cards). The first approach requires significant over-engineering of the total amount of buffer space required system-wide and drives these costs onto the line card. It cannot take advantage of the statistical gain made by accumulating traffic bursts across a large number of line cards. As was mentioned previously, in access applications each line may be idle for significant portions of the time. Further, access speeds vary widely depending on the services being offered. Rate adaptive services such as ADSL vary their speed based the loop conditions of individual customers. Taken together, this wide degree of per line variability lends itself to significant statistical gain if the traffic buffering is centralized. As well, under extreme load conditions—situations where upstream traffic must be discarded intelligently—it is very difficult to design the system so that traffic discard is handled optimally and fairly across all line cards. This is especially true when QoS (Quality of Service) issues need to be addressed.

The second approach eliminates the buffers on the line card, (Except possibly for the very small internal buffers used by the VORTEX and DUPLEX to keep the serial links operating efficiently with back-to-back transfers) but there are costs associated with this approach. The second approach requires that traffic be moved to its buffering point before PHY buffer overflow occurs on the line card. Hence the entire upstream data-path from PHY to first significant buffering point (i.e. the ATM traffic management device) must have sufficient capacity to ensure that it isn't a bottleneck.

For a particular VORTEX and DUPLEX architecture, a good rule of thumb is that the maximum aggregate upstream bandwidth of the PHYs on a single line card should be less than 155 Mbps. This eliminates the individual serial links as potential bottlenecks. On the core card the ANY-PHY bus sits between the VORTEXs and the ATM layer, so the 800 Mbps bus speed must also be taken into consideration. Hence another rule of thumb is that the maximum sustained upstream data rate, when taken in aggregate from all active PHYs, should be less than 800 Mbps. Since the WAN up-link is typically OC-3 or less in speed this is not a significant restriction. Note also that systems implemented with balanced load sharing between duplicated core cards can essentially double the upstream buffering capacity and the aggregate upstream burst tolerance of the system.

In very large access multiplexers such as DSLAMs one normally assumes that not every PHY is active at all times. However, in theory it may be physically possible for the aggregate upstream burst bandwidth to exceed the 800 Mbps bus capacity unless steps are taken to prevent this error condition. It is impractical to sustain 800 Mbps bursting for even a short period of time due to the massive amount of cell buffering that would be required to buffer cells while waiting for a DS-3 or OC-3 WAN up-link to clear the traffic. Hence the multiplexer's call setup software, also known as the Connection Admission Control (CAC) software, will need to prevent potential upstream traffic overflow by simply refusing additional connections if the multiplexer becomes overloaded. Having discussed why centralized buffering is the preferred approach, this discussion will now proceed to a description of the second stage of multiplexing for upstream traffic.

5.2.2. Option Selection

As described, the DUPLEX multiplexes all upstream traffic into a 200 Mbps serial stream and sends it simultaneously to the active and inactive core cards (The term "active core card" is used rather loosely here since load balancing designs do not have a strictly active and strictly inactive card. However, for simplicity, the discussion will continue to use the term "active core card" rather the longer but more accurate "core card active for the line card being discussed") via the 4-wire serial links. The VORTEX on the active core card terminates the serial link, monitors/counts transmission errors, discards idle cells, extracts the user cells, and places them on the core card's parallel ANY-PHY bus as described.

The VORTEX schedules upstream traffic from its eight serial links into the ANY-PHY bus. It implements a user programmable weighted round robin polling scheme. The per-link weights can usually be left to their default status, which is equal weight on all links. However, a higher weigh may be desirable on a specific link if, for example, the link is being used to connect to a co-processor card or perhaps a high speed PHY card that will be generating a large amount of traffic relative to the other line cards. Weights are relative and linear; a link with a weight two times another will be polled twice as often.

Each VORTEX has a raw upstream bandwidth capability of 1.6 Gbps (8 links at 200 Mbps each) while the core card ANY-PHY bus is typically a 800 Mbps bus (16 bit wide 50 MHz parallel bus). Therefore the VORTEX implements back-pressure on the serial links to prevent the upstream traffic from overflowing at the parallel bus. Each serial link is provided a small internal receive cell buffer. As the receive buffer approaches the full mark the VORTEX sends a back-pressure indication to the DUPLEX via the embedded system overhead channel in the downstream serial link. The DUPLEX, after receiving the buffer full indication, immediately begins sending idle cells until the back-pressure indication is deasserted by the VORTEX. (In the upstream direction it is sufficient to use a single back-pressure indication for all channels. Head of line blocking is not an issue because all traffic is being directed to a single port—the ATM layer device.)

In systems with duplicated core cards the state of an upstream link is determined (logically) by the state of the active bit on the corresponding downstream link. Upstream links corresponding to inactive downstream links continue to monitor for errors, but can be programmed to stay in the FIFO reset state so that upstream traffic on the spare link is discarded by the VORTEX (On the spare core card embedded control channel cells that are passed through to the ATM layer should normally be left to pass through (i.e. the FIFO should not be held in reset). Optionally, the inactive links can be programmed to function normally, thereby leaving the spare core card's ATM layer responsible for processing cells quickly enough to prevent buffer overflow in the VORTEX. Buffer overflow on an inactive upstream link is possible because the DUPLEX ignores flow control (back-pressure) information from the inactive link. This must be taken into consideration when determining how or if upstream user cells are handled on spare links.

In some situations less than 8 of the VORTEX serial links will be equipped. This occurs if line cards are not equipped, or if a shelf does not have a multiple of 8 line card slots. In this situation the unequipped serial links can be disabled through software. The serial signal pins for disabled links are left in tri-state.

In summary, in particular embodiments, the upstream data path on the uplink card (second stage multiplexing) operates according to the following:

1. Upstream cells are sent by the DUPLEX as soon as they are received from the PHYs. In protected systems the cells are sent simultaneously on both the active and inactive links.
2. The DUPLEX will temporarily suspend sending data from all PHYs when the active link is asserting back-pressure. Back-pressure from the inactive link is ignored.
3. The serial link and core card bus bandwidths are sufficient to ensure that, in a properly engineered system, any back-pressure is temporary and will not result in buffer overflow at the PHYs.
4. The VORTEX services its eight serial links in a simple weighted round robin fashion.
5. As each cell is received by the VORTEX it is tagged with a link ID (0.7) and a VORTEX ID (0.31) and made available to the ANY-PHY bus as discussed below in Multiplexing on the Core Card (Stage 3 Multiplexing).

5.2.3. Downstream (to the Line Card) Traffic

In a typical system, the WAN port will operate at a much higher rate than any of the individual PHYs on the line cards and therefore, under burst conditions, downstream traffic should be buffered until the respective PHY is able to receive it.

As with the upstream direction, the system designer of an access multiplexer or switch is faced with three choices: (1) put buffering on the line card and send cells to the line card as soon as the cell is received from the WAN port; or (2) only send cells, to a PHY when the PHY can accept them, leaving cells buffered on the core card until the PHY clears (This is the approach used in the VORTEX and DUPLEX architecture;) or (3) put buffering on all port cards, separated by a switching fabric. As is the case in the upstream direction, the first approach requires significant over-engineering of the total amount of buffer space required system-wide and drives these costs onto the line card. It cannot take advantage of the statistical gain made by centralizing the buffering of traffic bursts destined to a large number of line cards. (As was mentioned previously, in access applications each line may be idle for significant portions of the time. Further, access speeds vary widely depending on the services being offered. Rate adaptive services such as ADSL vary their speed based the loop conditions of individual customers. Taken together, this wide degree of per line variability lends itself to significant statistical gain if the traffic buffering is centralized.) To prevent internal bottlenecks the downstream data-path to every line card must be at least as fast as the WAN port if a simple downstream broadcast is used. Otherwise the core card will need to perform demultiplexing on the data stream and only send the cell to its appropriate line card.

One potential negative of the approach implemented by the VORTEX and DUPLEX is that the core card's traffic management device must function across a greater number of PHYs than a traffic management device on a single line card. However, a particular APEX Traffic Management device has been designed to perform a full featured traffic and buffer management function across 2048 PHYs while interfacing directly to any number of VORTEX devices.

As described, the DUPLEX sends the VORTEX the logical equivalent of each PHY's FIFO TCA status. (In a particular embodiment, the DUPLEX indicates the status of an internal cell deep buffer associated with each PHY. However, since the status of this buffer (full or empty) depends ultimately on the corresponding PHY's transmit FIFO it is accurate to characterize this back-pressure as a "proxy TCA" indication.) The information is sent on both the active and inactive links, but the remainder of this section, will only be discussing the behavior of active serial links in effect, each VORTEX appears to the traffic manager as a 256 port multi-PHY. This is depicted in FIG. 5.

For each of its 8 serial links the VORTEX provides an internal cell buffer for each of the maximum 32 PHYs supported by the downstream DUPLEX. This allows cell transfers to occur on different serial links simultaneously. The ANY-PHY bus is four times faster than the serial link, so this ensures the full 800 Mbps can be used. Each link schedules cells from its 32 cell buffer (one per downstream PHY) on a strictly round robin basis, where PHYs without downstream cells are skipped over of course.

It should be noted that the maximum effective downstream bandwidth for a single PHY is between ½ and ¼ the bandwidth of the serial link, depending on the timing of the ATM layer device acting as bus master. (The aggregate bandwidth of all the PHYs on multi-PHY line card can be about 90% of the serial link rate. The ½ to ¼ link rate restriction being discussed here applies only to each individual PHY.) This is due to buffer "high water mark" levels and internal back-pressure signal timing constraints. VORTEX registers can be configured in software to adjust the buffer fill level for line cards with very fast PHYs. An exception to this is when a single PHY is connected to the DUPLEX. In that case the full bandwidth of the serial link (up to approximately 90%) is available.

In summary, the downstream data path in the second stage of multiplexing is:
1. The VORTEX provides 256 "proxy TCA" signals that can be used directly by the ATM traffic management device to safely schedule cells directed to the PHYs on the line card.
2. The serial link bandwidth, the core card bus bandwidth, and the internal buffering in the VORTEX and DUPLEX devices are all sufficient to ensure that downstream traffic destined to one PHY does not block downstream traffic destined to another PHY regardless of where the two PHYs are located (i.e. whether they are on the same or different line cards).
3. Each link's active indication (in the downstream, direction) can be set individually by software. Inactive links (on the VORTEX) still present TCA information to the ATM layer device, but any cells sent on these links will be discarded by the DUPLEX.
4. As the VORTEX receives a downstream cell from the ATM layer the in-band prepended address is decoded and used to route the cell to the appropriate link and the appropriate internal PHY buffer.

5.3. Multiplexing on the Core Card (Stage 3 Multiplexing)

As was discussed in the previous section, in many ways the VORTEX acts as a proxy for all the PHYs attached to the corresponding DUPLEX devices. In one implementation, because each DUPLEX can interface to a maximum of 32 PHY devices, each VORTEX can link to eight DUPLEX, each VORTEX can represent up to 8×32=256 PHY devices. Further, there can be up to 31 VORTEX devices directly addressed on a single bus, although electrical limits on the bus may restrict the number of devices to be less. This, therefore, provides potentially a large number of PHYs or ports on an channel uplinking to a WAN interface.

This section discusses how the traffic from this many PHY devices is handled and addressed by the ATM layer in a particular implementation. For reasons that are discussed below, the upstream and downstream directions are handled differently. The remainder of this section discusses how traffic on the active core card's data path is handled.

5.3.1. Upstream (to the Core Card) Traffic

A problem encountered in any multiplexer of lower speed ports up to a high-speed channel is that the high-speed channel (such as the ATM layer) needs to know which port each cell came from. In ATM, there are two obvious choices, rely on a unique field within the original cell to identify the source, or add a small, unique PHY ID tag to each cell. Although it might be tempting to use the existing VPI/VCI address field present in every ATM cell to uniquely identify its port, this is not something that can be guaranteed unless the VPI/VCI values are restricted—not generally a desired solution.

In the present invention, what works better is to "tag" each cell with a prepended physical port ID, and then send the cell to the core card for processing. By adding a short tag to each cell the data path becomes fully "protocol neutral" and makes no assumptions about the contents or address fields within the user cells.

As was described, in a particular implementation, each DUPLEX and VORTEX multiplexes and tags its upstream traffic into a single stream of cells, which are offered one by one to the ATM layer by the VORTEX. Every upstream cell is tagged with prepend bits that uniquely identify the VORTEX ID (0.31), link ID (0.8), and PHY ID (0.31) (There is also a control channel cell identification, as discussed elsewhere herein.) to which the cell belongs. Since the physical source (i.e. the port) of each upstream cell is self-identified by its tag, the VORTEX can act as if the stream of upstream cells is coming from a single PHY. Put another way, in the upstream direction each VORTEX appears as a single PHY slave device supplying a stream of possibly expanded length cells (Optionally the PHY id tag can be passed in the UDF/HEC word without expanding the cell length.) to the ATM layer. This upstream tagging is illustrated in FIG. 5.

To accommodate more than one VORTEX on the bus, the ATM device need only poll the Receive Cell Available (RCA) status line of each of the VORTEX devices. Simple round robin polling of the devices will normally suffice because back-pressure is used for flow control on the individual serial links, and each VORTEX performs a user programmable weighted round robin polling of its 8 serial links.

In summary, the upstream data path on the core card in one embodiment, operates according to the following method:
1. Each VORTEX services its eight serial links in a simple weighted round robin fashion.
2. As each cell is received the VORTEX tags it with a link ID (0.7) and a VORTEX ID (0.31) and makes it available to the ANY-PHY bus. Since the DUPLEX will have added a PHY ID tag, the accumulated tag uniquely identifies the cell's source port. This is shown in FIG. 1.
3. The ATM layer device, acting as bus master, polls the RCA status of each of the VORTEX devices present on the bus. Each VORTEX looks like a single PHY to the ATM layer device. When a VORTEX indicates that it has a cell available it is read in by the ATM layer device for processing.

4. The ATM traffic management device is responsible for buffering upstream cells until they can be forwarded to the WAN link, sent back to a line card (for line to line switching), or otherwise processed.

5.3.2. Downstream (to the Line Card) Traffic

To the ATM layer each of the VORTEX devices on the core card's ANY-PHY bus appears, in the downstream direction, as if it were a 256+8 port multi-PHY. (The extra 8 channels are the embedded control channel per link.) Further, there can be numerous VORTEX devices on the bus, limited mainly by electrical loading. In order to schedule cell traffic into these numerous PHYs the ATM layer device must efficiently perform three related functions: TCA status polling, PHY selection, and cell transfer.

On each bus cycle the ATM layer device, which is bus master, can poll the status of an individual PHY's proxy TCA status. It does this by presenting a PHY address on the ANY-PHY bus address lines. If the VORTEX acting as proxy for the polled PHY has room for the cell in its internal buffer then it will raise its TCA line two bus clock cycles after the polling address is presented. All other VORTEX on the bus will tri-state their TCA line. As discussed below, PHY polling uses a different addressing mechanism than PHY selection for cell transfer. This gives guaranteed and deterministic access to polling bandwidth over the transmit address lines.

None of the VORTEX devices on the bus will respond to a NULL address (all ones) poll. The ATM layer device will insert a NULL address between valid PHY addresses to give the previously polled VORTEX time to tri-state the TCA line. If the TCA line is not shared among slave devices then a PHY addresses can be presented on every bus cycle.

For PHY selection (to initiate cell transfer) in the downstream direction in-band addressing is used. With this scheme the ATM layer device prepends the selected PHY address to the transmitted cell. The TSX (transmit start of transfer) bus signal is asserted by the ATM layer device during the first cycle of a data block transfer (coinciding with the PHY address) to mark the start of a block transfer period.

All VORTEX devices on the bus receive all cells. It is up to the appropriate VORTEX to recognize the PHY address and latch in the remainder of the cell. The other VORTEX devices will simply ignore the cell. The mapping of the PHY address space of each VORTEX is programmed by software at device initialization time. FIG. 7 shows the Downstream Cell Overhead.

In summary, the downstream data path on the core card in one embodiment, operates according to the following method:

1. Traffic arrives from the WAN link and is buffered by the ATM layer.
2. The ATM layer prepends each cell with a 12 bit PHY address that identifies the VORTEX, link, and PHY (or identifies the VORTEX, link, and the embedded control channel). This information is used by the VORTEX to determine whether a cell that is placed on the ANY-PHY bus by the ATM layer should be read in or ignored.
3. For each PHY to which the VORTEX is connected (via its 8 DUPLEXs) the VORTEX provides a proxy TCA signal that is polled by the ATM layer via external address lines.

6. Example APEX Architecture Description

Figure 8:
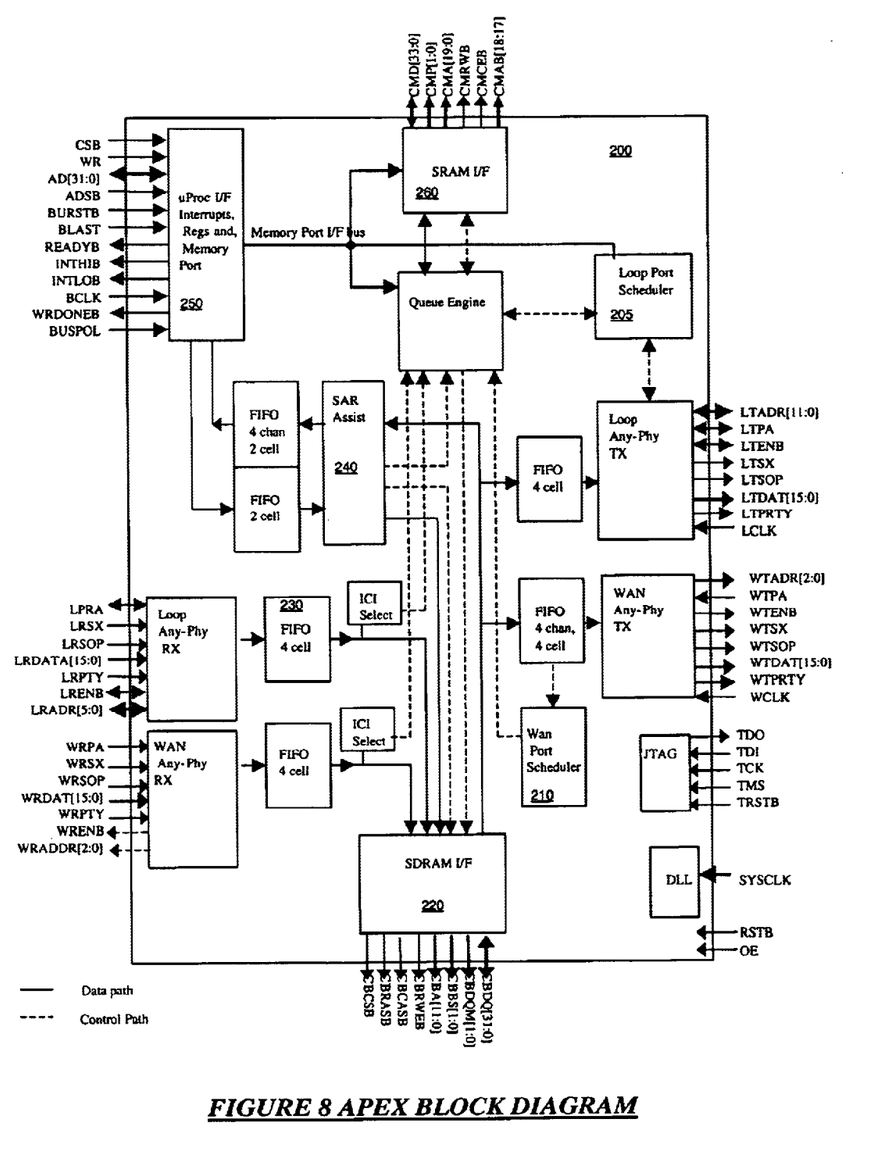
FIG. 8 shows a functional block diagram of an APEX that can embody aspects of the invention.

FIG. 8 shows a function block diagram of an APEX ATM traffic manager 200 according to a specific embodiment of the invention, as described in greater detail in the above referenced documents. The functional diagram is arranged such that cell traffic flows through the APEX from left to right. The APEX is a full duplex ATM traffic management device, providing cell switching, per VC queuing, traffic shaping, congestion management, and hierarchical scheduling to up to 2048 loop ports and up to 4 WAN ports.

The APEX provides per-VC queuing for 64 K VCs. A per-VC queue may be allocated to any Class of Service (COS), within any port, in either direction (ingress or egress path). Per-VC queuing enables PCR or SCR per-VC shaping on WAN ports and greater fairness of bandwidth allocation between VCs within a COS.

The APEX provides three level hierarchical scheduling for port, COS, and VC level scheduling. There are two, three level schedulers; one for the loop ports 205 and one for the WAN ports 210. The APEX supports up to 256 k cells of shared buffering in a 32-bit wide SDRAM, accessed through interface 220. Memory protection is provided via an inband CRC-10 on a cell by cell basis.

AAL5 SAR assistance 240 is provided for AAL5 frame traffic to and from the uP. The APEX provides a 32-bit microprocessor bus interface through 250 for signaling, control, cell and frame message extraction and insertion, VC. Class and port context access, control and status monitoring, and configuration of the IC. Microprocessor burst access for registers, cell and frame traffic is supported. The APEX provides a 36-bit SSRAM interface 260 for context storage supporting up to 4 MB of context for up to 64 kVCs and up to 256 k cell buffer pointer storage. Context Memory protection is provided via 2 bits of parity over each 34-bit word.

7. Example VORTEX Architecture Description

Figure 9:
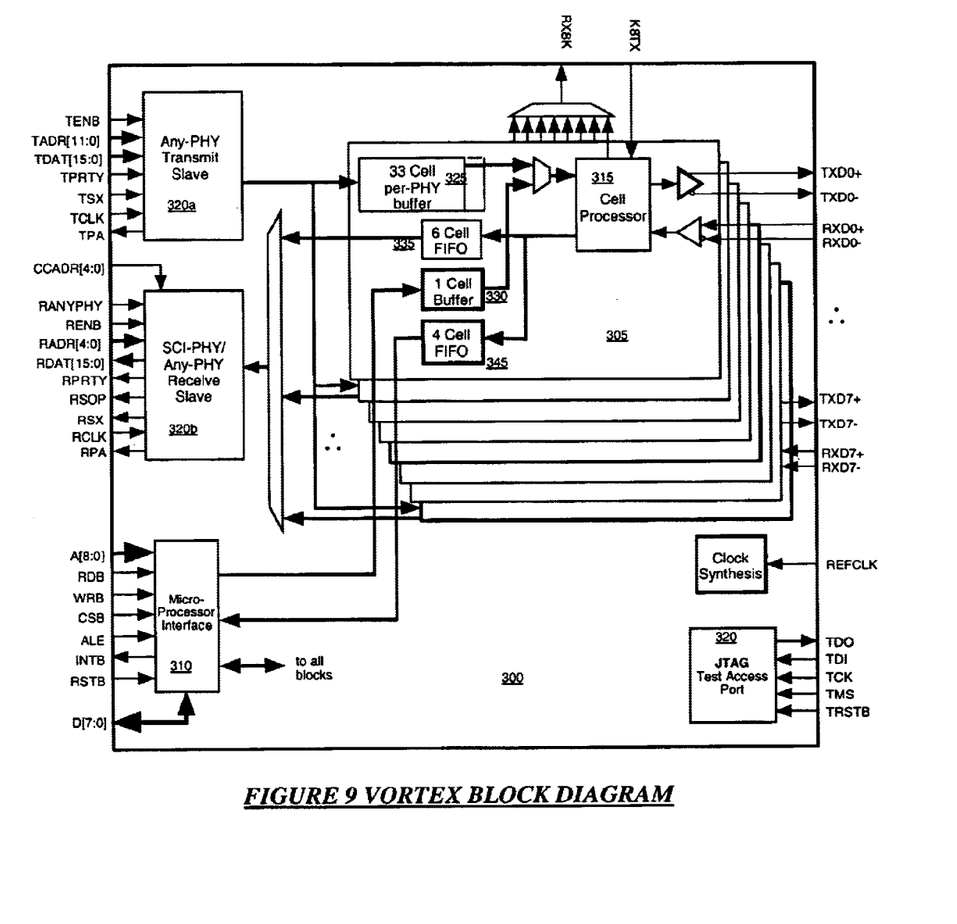
FIG. 9 shows a functional block diagram of a VORTEX that can embody aspects of the invention.

FIG. 9 shows a functional block diagram of a VORTEX 300 that may embody aspects of the invention. Main components of the VORTEX includes a set of per-serial-link control functions 305. For each serial link there is a cell processor 315, 33 cell per-PHY transmit buffer 325, a five-cell FIFO 335, one-cell incoming microprocessor buffer 330, and four-cell incoming microprocessor FIFO 345. The microprocessor interface 310 is provided for device configuration, control and monitoring by an external microprocessor. Normal mode registers and test mode registers can be accessed through this port. Test mode registers via 320 are used to enhance the testability of the VORTEX. The interface has an 8-bit wide data bus. Multiplexed address and data operation is supported.

To provide flexibility, two mechanisms are provided for the transport of a control channel. Control channel cells can be inserted and extracted either via the microprocessor interface or via an external device transferring control channel cells across the Any-PHY interface 320*b*. The control channel cell insertion and extraction capabilities provide a simple unacknowledged cell relay capability. For a fully robust control channel implementation, it is assumed the local microprocessor and the remote entity are running a reliable communications protocol.

The VORTEX contains a one cell buffer 330 per high-speed link for the insertion of a cell by the microprocessor onto the high-speed serial links. Optional CRC-32 calculation relieves the microprocessor of this task.

8. Example DUPLEX Architecture Description

Figure 10:
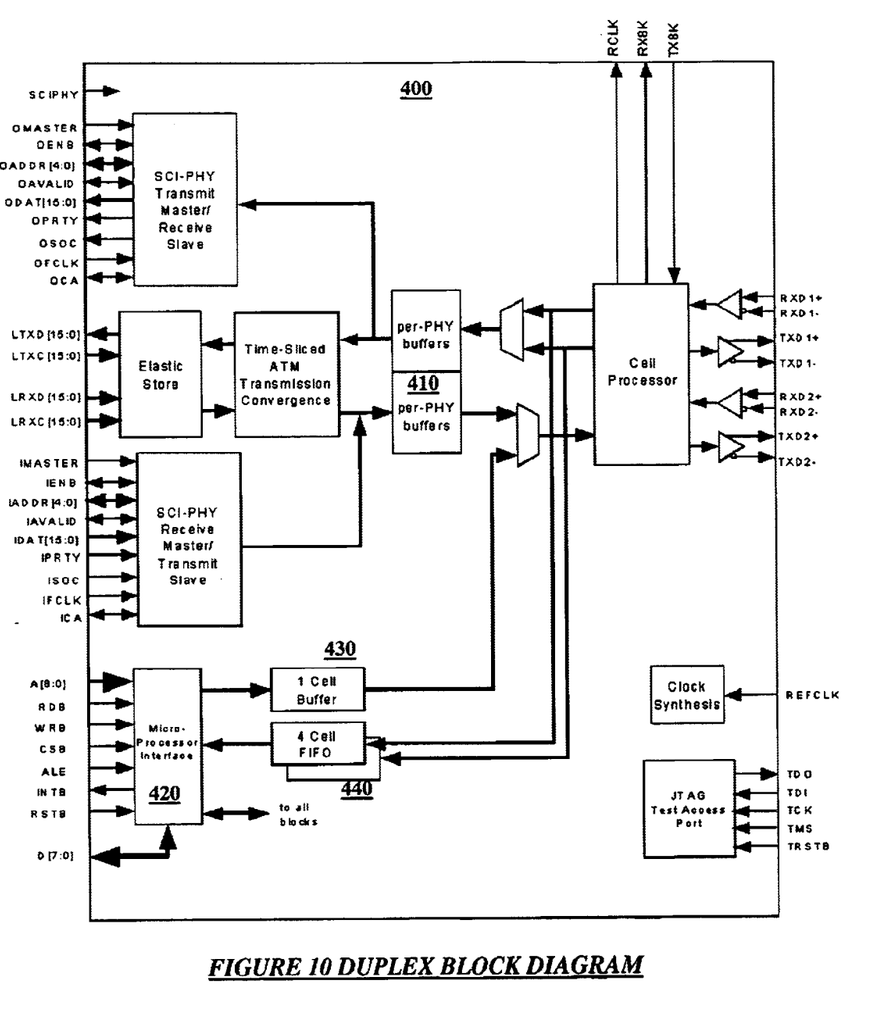
FIG. 10 shows the functional block diagram of a DUPLEX 400 that can embody aspects of the invention.

FIG. 10 shows the functional block diagram of the DUPLEX 400. Although separated to improve clarity, many signals in the following diagram share physical package pins. The use of the Any-PHY interfaces and the clocked serial data interfaces is mutually exclusive. In one embodiment, the DUPLEX is ATM specific. It exchanges contiguous 53 byte cells with PHY devices. The PHY interface can be either clocked serial data or Any-PHY Level 2.

With an Any-PHY interface, the DUPLEX coordinates cell exchanges with up to 32 modems. In the upstream direction, the modems are polled in a pure round robin manner and cells are queued in two cell FIFOs 410 dedicated to each modem. In the downstream direction, the cell buffer is logically partitioned into a four cell FIFO for each modem to avoid head-of-line blocking. Those modems associated with non-empty FIFOs are polled round robin. An extended cell format provides four extra bytes for the encoding of flow control, timing reference, PHY identification and link maintenance information. A redundant (or spare) link is provided to allow connection to two cell processing cards.

The DUPLEX Microprocessor 420 Interface is provided for device configuration, control and monitoring by an external microprocessor. Normal mode registers and test mode registers can be accessed through this port. A cell insertion and extraction capability provides a simple unacknowledged cell relay capability.

In the upstream direction, control channel cells are broadcast on both the active 422a and spare 422b high-speed serial links. The contents of the cells shall distinguish the two control channels if necessary. In the downstream direction, each high-speed serial link has a dedicated queue for the control channel cells.

The control channel is treated as a virtual PHY device. In the upstream direction, it is scheduled with the same priority as the other logical channels. In the downstream direction, control channel cells are queued in a four cell FIFO for each high-speed serial link. If either FIFO contains two or more cells, the cell available bit, UPCA, returned upstream is deasserted to prevent cell loss when the microprocessor cell reads fail to keep pace with the incoming control channel cells.

The DUPLEX contains a one cell buffer 430 for the insertion of a cell by the microprocessor into the high-speed serial interface. All cells written by the microprocessor will have binary 111110 encoded in the PHYID[5:0] field within the cell prepend bytes. This distinction between user cells and control cells provides a clear channel for both types of cells.

By default, cells received on the high-speed serial link will be routed to the Microprocessor Cell Buffer FIFO 440 if the PHYID[5:0] prepend field is binary 111110. The control channel cells can be programmed to be routed to the Any-PHY interface instead. Buffer 440 has a capacity of four cells. The UPCA bit returned on the upstream high-speed serial link will be set to logic 0 when the buffer contains more than two cells, This shall prevent overflow of the local buffer if the indication is responded to within two cell slots.

9. Other Embodiments

The invention has now been described with reference to specific embodiments, including details of particular circuit implementations incorporating aspects of the invention. Other embodiments will be apparent to those of skill in the art. In particular, methods according to the invention can be used in a wide variety of communications applications different from those illustrated herein.

It is understood that the examples and embodiments described herein are for illustrative purposes and that various modifications or changes in light thereof will be suggested by the teachings herein to persons skilled in the art and are to be included within the spirit and purview of this application and scope of the claims. All publications, patents, and patent applications cited herein are hereby incorporated by reference in their entirety for all purposes.

What is claimed is:

1. A method of flow control in a digital communications system wherein data flows in a first direction in a channel and in a second opposite direction in multiple channels comprising:

in a transferred data unit in said first direction, including a portion of data indicating available/not-available status of a set of channels in said second direction;

prior to selecting a channel in said second direction for transmitting a data unit, checking status of said channel as indicated in said portion;

selecting a channel for transmission from among channels indicated available in said portion; and wherein said portion indicates status of a part of possible channels in said second direction and wherein multiple data units in said first direction must be received to update status of all channels in said second direction.

2. The method according to claim 1 wherein there is a delay between reception of said portion and said selecting and wherein sufficient buffering is provided on said second channels to compensate for said delay.

3. The method according to claim 1 wherein said portion comprises a set of bit-flags, the state of each bit flag indicating available/not-available status of one of said channels in said second direction.

4. The method according to claim 1 wherein said status indicates space available in a buffer for a second direction channel and wherein a number of spare buffer locations are available to compensate for a delay in signaling said status.

5. The method according to claim 1 wherein a cell transmitted on a link includes a bit-oriented code (BOC) portion, wherein BOCs are used to carry predefined or user-defined signaling.

6. The method according to claim 5 wherein bit oriented codes are transmitted as a repeating 16-bit sequence consisting of 8 ones, a zero, 6 code bits, and a trailing zero.

7. The method according to claim 1 wherein:

said flow control is per logical channel;

said portion comprises multiple bits per data unit used to indicate downstream status; and wherein said per logical channel flow control uses a simple XON/XOFF control.

8. The method according to claim 1 further comprising:

including in said data units a timing reference independent of a serial link bit rate.

9. The method according to claim 1 wherein each data unit transmitted contains downstream status information.

10. The method according to claim 9 wherein each data unit transmitted in said first direction contains 16 bits of information that convey the status for 16 of 32 active channels in said second direction.

11. The method according to claim 1 wherein a separate overhead bit per data unit conveys buffer status of a far-end microprocessor port.

12. A method for downstream data flow control comprising:
- placing cells for downstream channels into a plurality of buffers, said buffers grouped into sets of buffers;
- for a set of said sets, scheduling a cell out of said set and transmitting said cell to an access module, said access module serving a plurality of channels; said scheduling comprising:
  - eliminating from a scheduling round a channel that is presenting a far-end buffer full status;
  - performing an access algorithm among remaining eligible channels to share a downstream link; and
  - when there is no data in any buffer in a set of buffers, generating a stuff cell for said set and transmitting said stuff cell on a link for said set.

13. The method according to claim 12 wherein said plurality of buffers comprises at least a single cell buffer for each channel and wherein said sets are each assigned to a link, said link providing a serial data connection from a scheduler to an access module.

14. The method according to claim 12 wherein scheduling of a cell is performed when a previous cell has been fully transmitted from a buffer over a link.

15. A method for upstream data flow control comprising:
- placing cells for upstream transmission from a plurality of logical channels into a plurality of shared buffers; and
- servicing said shared buffers with a weighted round-robin algorithm to present said cells to an upstream bus master as a single cell stream wherein when an upstream buffer has less than a preset number of empty cell buffers, said upstream buffer deasserts a cell available bit sent in system overhead of a corresponding downstream link and wherein a far end device begins sending stuff cells upon indication that the upstream buffer is unavailable.

16. The method according to claim 15 wherein said present number is three, allowing for two additional cells to be accepted after a cell available bit is deasserted.

17. A digital communications system wherein data flows in a first direction in a channel and in a second opposite direction in multiple channels comprising:
- means for performing flow control comprising:
  - means for including a portion of data indicating available/not-available status of a set of channels in said second direction in a transferred data unit in said first direction;
  - means for checking status of said channel as indicated in said portion prior to selecting a channel in said second direction for transmitting a data unit;
  - means for selecting a channel for transmission from among channels indicated available in said portion; and
  - wherein said portion indicates status of a part of possible channels in said second direction and wherein multiple data units in said first direction must be received to update status of all channels in said second direction.

18. The system of claim 17 wherein there is a delay between reception of said portion and said selecting and further comprising means for sufficient buffering on said second channels to compensate for said delay.

19. The system of claim 17 wherein said portion comprises flag means, the state of each flag means indicating available/not-available status of one of said channels in said second direction.

20. The system of claim 17 wherein:
- said status indicates space available in a buffer for a second direction channel and wherein a number of spare buffer locations are available to compensate for a delay in signaling said status.

21. The system of claim 17 further comprising:
- means for including a bit-oriented code (BOC) portion in a cell transmitted on a link, wherein BOCs are used to carry predefined or user-defined signaling;
- means for performing flow control per logical channel;
- means for including in said data units a timing reference independent of a serial link bit rate; and
- means for including in transmitted data units downstream status information.

22. The system of claim 17 further wherein:
- said portion comprises multiple bits per data unit used to indicate downstream status;
- said per logical channel flow control means uses a simple XON/XOFF control;
- a separate overhead bit per data unit conveys buffer status of a far-end microprocessor port.

23. A downstream data flow controller comprising:
- means for placing cells for downstream channels into a plurality of buffer means, said buffer means grouped into sets of buffer means;
- means for scheduling a cell out of a set of said sets;
- means for transmitting said cell to an access module, said access module serving a plurality of channels;
- means for eliminating from a scheduling round a channel that is presenting a far-end buffer full status; and
- means for performing an access algorithm among remaining eligible channels to share a downstream link,
- means for generating a stuff cell for said set and means for transmitting said stuff cell on a link for said set when there is no data in any buffer means in a set.

24. An upstream data flow controller comprising:
- means for placing cells for upstream transmission from a plurality of logical channels into a plurality of shared buffer means; and
- means for servicing said shared buffer means with a weighted round-robin algorithm to present said cells to an upstream bus master means as a single cell stream;
- wherein when an upstream buffer means has less than a preset number of empty cell buffers, said upstream buffer means deasserts a cell available bit sent in system overhead of a corresponding downstream link and wherein a far end device begins sending stuff cells upon indication that the upstream buffer means is unavailable.

* * * * *